United States Patent [19]

Amoss

[11] Patent Number: 5,983,620
[45] Date of Patent: Nov. 16, 1999

[54] VERSATILE 'KENTER ' TYPE DETACHABLE ANCHOR CONNECTING LINK

[76] Inventor: Robert S. Amoss, 3118 Ursaline Ave., New Orleans, La. 70119

[21] Appl. No.: 09/113,959

[22] Filed: Jul. 10, 1998

Related U.S. Application Data

[60] Provisional application No. 60/052,272, Jul. 11, 1997.

[51] Int. Cl.⁶ .................................................. F16G 15/04
[52] U.S. Cl. ........................................................... 59/85
[58] Field of Search ................... 59/84, 85, 86, 59/78, 93

[56] References Cited

U.S. PATENT DOCUMENTS

| | | | |
|---|---|---|---|
| 859,082 | 7/1907 | Kenter | 59/85 |
| 4,056,929 | 11/1977 | Chrobak et al. | |
| 4,179,878 | 12/1979 | Albertini . | |
| 4,180,971 | 1/1980 | Klinke . | |
| 4,418,526 | 12/1983 | Clement | 59/85 |
| 4,428,187 | 1/1984 | Bruce . | |
| 4,590,758 | 5/1986 | Hanning et al. . | |
| 5,345,754 | 9/1994 | Deramaux et al. . | |

FOREIGN PATENT DOCUMENTS

| | | | |
|---|---|---|---|
| 0 562 949A1 | 9/1993 | European Pat. Off. . | |
| 2 311 230 | 1/1977 | France . | |
| 2581150 | 10/1986 | France | 59/85 |
| 1226839 | 10/1966 | Germany | 59/85 |
| 2137722 | 10/1984 | United Kingdom | 59/85 |

*Primary Examiner*—David Jones
*Attorney, Agent, or Firm*—Garvey, Smith, Nehrbass & Doody, L.L.C.

[57] ABSTRACT

A "Kenter" type detachable anchor connecting link without button shoulders shows no apparent loss of strength compared to one with button shoulders. Versatility, however, is increased, enabling one link to fit several chain sizes, instead of just one. Preferably, the button is aligned with the link cross section.

8 Claims, 2 Drawing Sheets

New Versatile Kenter Pear Link

Sec. A-A

Sec. B-B

Typical Kenter Link Before Improvement

Old Sec. A-A
Button Shoulders

Old Sec. B-B
Link Body 5,983,620

VERSATILE 'KENTER' TYPE DETACHABLE ANCHOR CONNECTING LINK

CROSS-REFERENCE TO RELATED APPLICATIONS

Priority of my U.S. Provisional Patent Application Ser. No. 60/052,272, filed Jul. 11, 1997, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to links for chains. More particularly, the present invention relates to links for chains and anchors.

2. General Background of the Invention

Stud Link Anchor Chain (SLAC) and Accessories

Stud link anchor chain is primarily used as ship's anchor chain and mooring chain for buoys or oil rigs. A shot of ship chain is usually supplied in 15 fathoms (90') lengths. Each shot is made of common links. It can also be used for chafing gear in towing set ups, hauling chain for marine railways and many other uses where a chain with the extra stability of a stud is desired. The accessories needed for a complete assembly include such items as detachable anchor chain connecting links, detachable anchor connecting links, anchor shackles, swivels, enlarged links, open links,joining shackles, end shackles and others. There are many different styles of shackles, swivels and connecting links. Accessories can be forged (preferred by buyers) or cast steel. The anchor comes with its own fixed (not detachable) anchor shackle that must be connected to the chain or swivel unit.

Connecting Links

The two main types of connecting links (chain or anchor) in use are Kenter style links or "Baldt" style links. The difference between the two is the design of the way the links open and close. The Kenter link consists of two opposite halves that slide together. The Baldt link has a C-shaped body and uses two caps to connect the open end of the C together.

Detachable Anchor Connecting Links and "D" Shackles

The advantage of using a detachable anchor connecting link is that it can hook directly to a common link. The D shackle, because of the large ends, must be hooked to a larger link such as an open link before joining with a common link or swivel. The Baldt type detachable anchor connecting link is favored over the Kenter style because it can fit a range of chain sizes allowing a chain supplier to stock fewer sizes.

The following U.S. Patents are incorporated herein by reference: 4,056,929; 4,179,878; 4,180,971; 4,418,526; 4,428,187; 4,590,758; and 5,345,754; The reader may wish to review the following patent applications as well: Fr. 2311230; EP 562949; and German 1 226 839.

BRIEF SUMMARY OF THE INVENTION

The present invention solves the problems confronted in the art in a simple and straightforward manner. The present invention is a versatile, dependable accessory that connects an anchor to a chain. The present invention is an improvement of the Kenter style anchor connecting link which allows it to be used for a range of chain sizes similar to the Baldt anchor connecting link.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Improved Kenter Anchor Connecting Link

Figure 6:
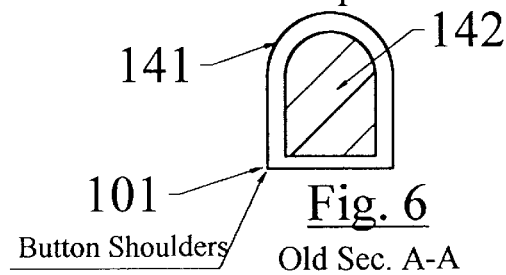
FIG. 6 is a sectional view of what one would see if the apparatus in FIG. 3 were the prior art, taken along the lines A—A in FIG. 3.
Figure 7:
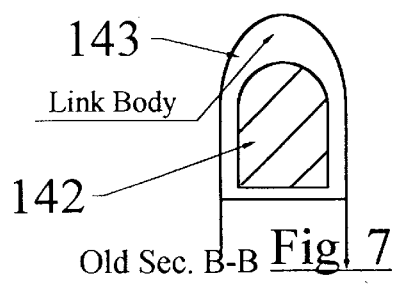
FIG. 7 is a sectional view of what one would see if the apparatus in FIG. 3 were the prior art, taken along the lines B—B in FIG. 3.

The previous limitation of the Kenter anchor connecting link was due to the size of the button end of the small half of the link. As shown in FIGS. 6 and 7, the button 141 of prior art Kenter anchor connecting link includes button "shoulders" 101 and a relatively large diameter link body 143. A button neck 142 connects the button 141 to the link body 143. The button end of the small half of the link must pass through a small opening, usually the common link of the chain. The button "shoulders" 101 of the conventional Kenter link protrude thereby limiting the fit through the opening.

Figure 4:
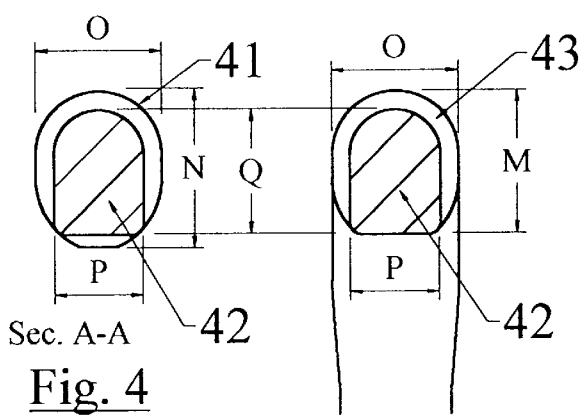
FIG. 4 is a sectional view of the preferred embodiment of the apparatus of the present invention, taken along the lines A—A in FIG. 3 (for clarity, FIGS. 4 and 5 do not show the anchor shackle end)
Figure 5:
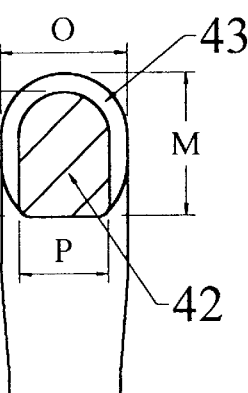
FIG. 5 is a sectional view of the preferred embodiment of the apparatus of the present invention, taken along the lines B—B in FIG. 3.

As shown in FIG. 4, the button shoulders are eliminated in the present invention, thereby reducing the diameter N of the button 41. Also, as shown in FIG. 5, the diameter M of the link body is reduced to approximately that of the button 41. Because of these reduced diameters, the chain end 40 of the present invention can fit through the common links of smaller chains than can the chain end of prior art Kenter links. By eliminating the shoulders 101 and aligning the button with the link cross section the link of the present invention will fit several chain sizes.

As shown in FIG. 4, the button 41 is reduced in diameter so much that button 41 and neck 42 share edges; likewise, as shown in FIG. 5, the chain end link body 43 is reduced in diameter so much that the body 43 and the neck 42 share edges. Because the neck 42 is the smallest diameter part of the chain end 40, reducing the diameter of button 41 and of link body 43 so much that button 41 shares edges with neck 42 and link body 43 shares edges with neck 42 does not reduce the strength of the link 10 of the present invention, as long as the diameter of button 41 and the diameter of link body 43 is not less than the diameter of neck 42.

Figure 1:
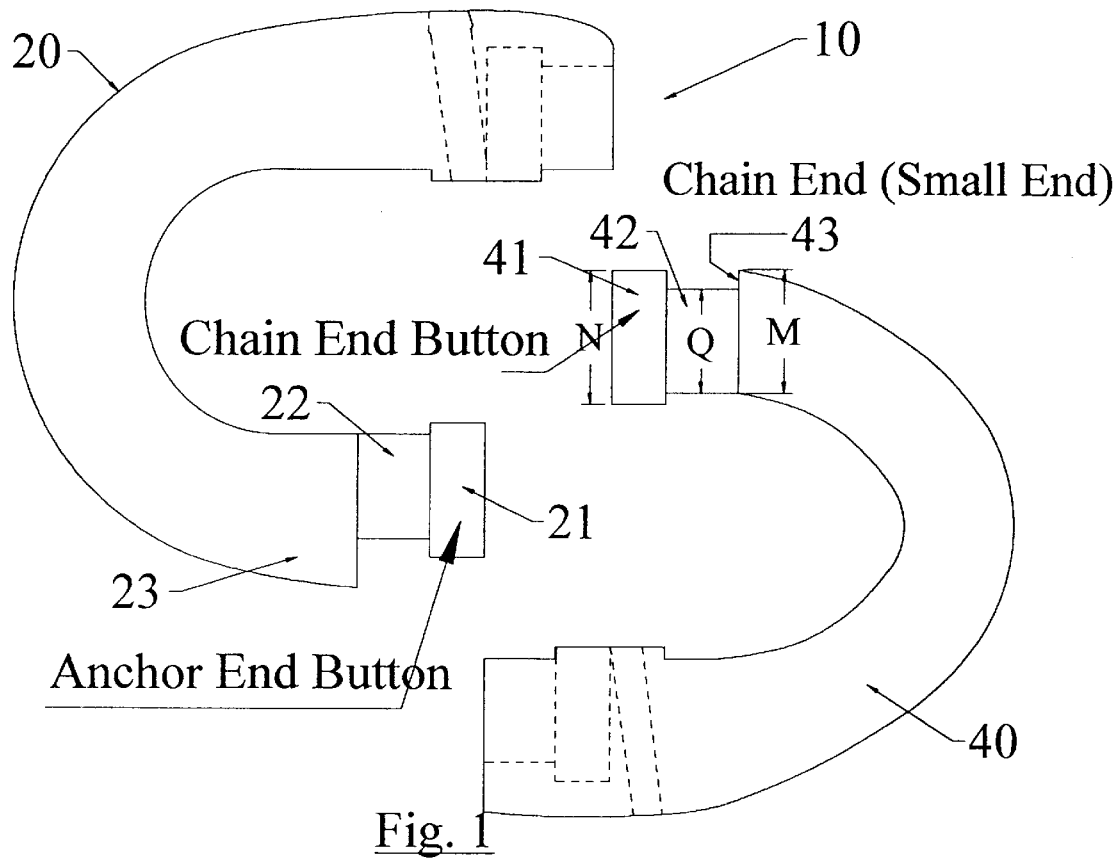
FIG. 1 is a front view of the preferred embodiment of the apparatus of the present invention, with the apparatus disassembled, and with the center stud and pin omitted.
Figure 2:
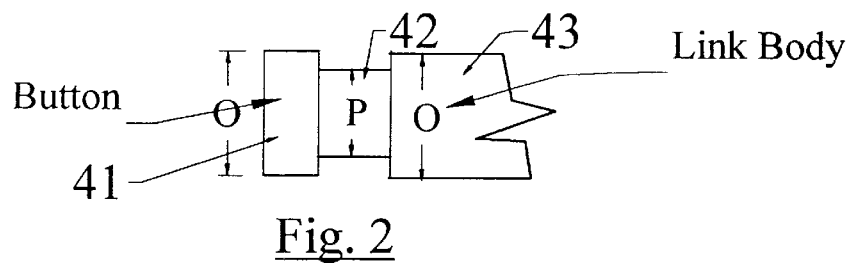
FIG. 2 is a detail of the top of the chain end button.
Figure 3:
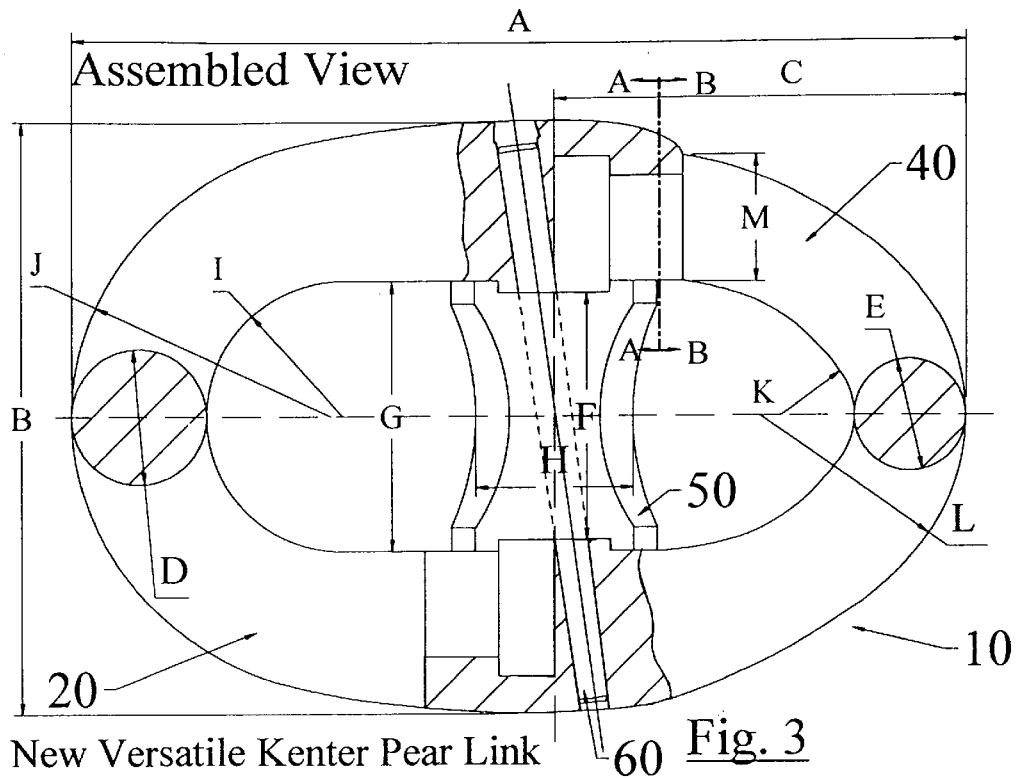
FIG. 3 is a partially cut-away view of the preferred embodiment of the apparatus of the present invention.

As shown in FIG. 3, the minimum diameter E of the chain link end is smaller than diameter M. The diameter of the chain end link body 43 is not greater than diameter M from the point where the neck 42 connects to the link body 43 around approximately ¾ of the chain end link body. This allows chains which can fit over button 41 to fit over the chain end link body 43 as well.

With the present invention, diameter N and diameter M are very close in size (though either could be larger than the other). Preferably, diameter M is 0.9–1.1 times diameter N. More preferably, diameter M is 0.95–1.05 times diameter N. Even more preferably, diameter M is 0.98–1.02 times diameter N. Most preferably, diameter M and diameter N are equal.

Because in the present invention, sharp corners are omitted (compare FIGS. 4 and 5 with FIGS. 6 and 7, respectively), the present invention, though using less material, is believed to be actually stronger than prior art Kenter links of comparable size, yet the links of the present invention are more versatile, fitting chains of more sizes. Preferably, the angle of the edges of the neck, button, and link body is not less than 90 degrees; more preferably, the angle of the edges of the neck, button, and link body is not less than 100 degrees; most preferably, the angle of the edges of the neck, button, and link body is not less than 120 degrees.

Buttons 21 and 41 are preferably made in the same shape so that they will both break at the same strain.

Aside from the changes mentioned and shown herein, the Kenter link 10 of the present invention can be the same as a prior art Kenter link (for example, it includes a recess in the anchor shackle end 20 to receive the chain end button 41 and it includes a recess in the chain end 40 to receive the anchor end button 21).

The most popular size of Kenter link used in the U.S. is a #4 detachable anchor connecting link. The #4 detachable Kenter anchor connecting link of the present invention is suitable for hooking an anchor to chain sizes ranging from 1 ¼" to 1 ½". Links covering chain sizes from ½" all the way to the largest chain measuring more than 7" can be made as well. The same improvement applies to all of the links.

Link Material and Grades

The link material can be cast (ASTM A-27) or forged (ASTM A-668) steel, for example. There are many classification societies such as ABS (American Bureau of Shipping), Lloyds, BV (Bureau Veritas), DNV (Det Norske Veritas), etc. that will examine the link and supervise the testing before certifying its use for a vessel or mooring setup under their classification. The links can, for example, be ABS-certified grade 3 links for use in the US. A higher grade link suitable for offshore mooring chain use can also be made. There are many grades for offshore mooring chain such as: grade 4, RQ4, NV K4 RIG, ARCTIC, ORQ, ORQ3, NV K3 RIG, as well as the ship chain Grades 1, 2 and 3. The improved Kenter link could be used for any of these grades as well as a mill certified link that might be used on a vessel without classification.

PARTS LIST:

The following is a list of parts and materials suitable for use in the present invention:

| | |
|---|---|
| 10 | Kenter pear link of the preferred embodiment of the present invention |
| 20 | anchor shackle end of Kenter pear link 10 |
| 21 | anchor end button |
| 22 | anchor end button neck |
| 23 | anchor end link body |
| 40 | chain end of Kenter pear link 10 |
| 41 | chain end button |
| 42 | chain end button neck |
| 43 | chain end link body |
| 50 | center stud |
| 60 | pin |
| 141 | prior art chain end button |
| 142 | prior art chain end button neck |
| 143 | prior art chain end link body |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

I claim:

1. A Kenter pear detachable anchor connecting link, comprising:

an anchor shackle end (20) having an anchor end button (21), an anchor end link body(23), and an anchor end button neck (22) connecting the anchor end button (21) and the anchor end link body (23);

a chain end (40) having a chain end button (41), a chain end link body (43), and a chain end button neck (42) connecting the chain end button (41) and the chain end link body (43), the chain end button (41) having a first diameter N and the chain end link body (43) having a second diameter (M);

a center stud (50);

a pin (60) connecting the center stud (50) to the anchor shackle end (20) and to the chain end (40), wherein the second diameter (M) is 0.9–1.1 times the first diameter N.

2. The link of claim 1, wherein the second diameter is 0.95–1.05 times the first diameter.

3. The link of claim 1, wherein the second diameter is 0.98–1.02 times the first diameter.

4. The link of claim 1, wherein the second diameter is approximately equal to the first diameter.

5. The link of claim 1, wherein the chain end button, the chain end link body, and the chain end button neck each have edges having angles, and the angles of the edges of the neck, button, and link body are not less than 90 degrees.

6. The link of claim 5, wherein the angles of the edges of the neck, button, and link body are not less than 100 degrees.

7. The link of claim 5, wherein the angles of the edges of the neck, button, and link body are not less than 120 degrees.

8. The link of claim 1, wherein the chain end button is aligned with the chain end link body cross section at the point at which the chain end button neck meets the chain end link body.

* * * * *